(12) United States Patent
Hori et al.

(10) Patent No.: US 8,157,319 B2
(45) Date of Patent: Apr. 17, 2012

(54) SUNROOF DEVICE AND DEFLECTOR

(75) Inventors: Kenji Hori, Anjo (JP); Hiroyuki Ida, Kariya (JP); Masaji Ishikawa, Toyota (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 12/737,877

(22) PCT Filed: Nov. 30, 2009

(86) PCT No.: PCT/JP2009/070096
§ 371 (c)(1),
(2), (4) Date: Feb. 25, 2011

(87) PCT Pub. No.: WO2010/064596
PCT Pub. Date: Jun. 10, 2010

(65) Prior Publication Data
US 2011/0148154 A1   Jun. 23, 2011

(30) Foreign Application Priority Data
Dec. 5, 2008   (JP) .................................. 2008-311536

(51) Int. Cl.
*B60J 7/22* (2006.01)
(52) U.S. Cl. ......................................................... 296/217
(58) Field of Classification Search .................. 296/217
See application file for complete search history.

(56) References Cited

U.S. PATENT DOCUMENTS

| 5,660,429 A | 8/1997 | Wienchol |
| 5,671,970 A | 9/1997 | Edelmann |

FOREIGN PATENT DOCUMENTS

| DE | 40 12 569 | 5/1991 |
| DE | 40 33 027 | 4/1992 |
| JP | 63-176785 | 7/1988 |
| JP | 1-65770 | 4/1989 |
| JP | 1-83615 | 6/1989 |
| JP | 8-216692 | 8/1996 |
| JP | 1175221 | 6/2003 |
| JP | 2009-126342 | 6/2009 |

OTHER PUBLICATIONS

International Search Report.

*Primary Examiner* — Dennis Pedder
(74) *Attorney, Agent, or Firm* — Finnegan, Henderson, Farabow, Garrett & Dunner, LLP (57) ABSTRACT

A sunroof device comprises a movable panel being able to open and close an opening section provided on a roof of a vehicle, and a deflector. The deflector has a body section arranged at a front end portion of the opening section, arranged to be able to spread out over a surface of the roof in correspondence to the position of the movable panel or to retract under the surface, and extending in the width direction of the vehicle; and support sections associated with both ends of the body section in the width direction and pivotably supporting the body section relative to the roof. The deflector is further provided with a plurality of protruding portions at an upper portion of the body section and at a part in the width direction of the body section which part corresponds to the position of a low strength place on the roof.

20 Claims, 5 Drawing Sheets

SUNROOF DEVICE AND DEFLECTOR

TECHNICAL FIELD

The present invention relates to a sunroof device with a defector for suppressing the air quantity flowing into a cabin from an opening section provided on a vehicle roof during the travelling a vehicle, and also to a deflector.

BACKGROUND ART

In a sunroof device which enables an opening section provided on a roof of a vehicle to be opened or closed as desired, there has heretofore been one in which a deflector being able to spread out over a roof surface or retract under the roof surface is provided at a front end of the opening section. The deflector is for preventing air from flowing into the vehicle cabin when the opening section is opened or for controlling the flow of air over the roof to prevent noises during the vehicle travelling and is known by, for example, one disclosed in Patent Document 1. The deflector shown in Patent Document 1 is formed to one body made of a resin as a whole. Further, in the deflector shown in Patent Document 1, concave shapes for controlling the flow of air are provided at an upper part thereof throughout the whole in the vehicle width direction.

PRIOR ART DOCUMENT

Patent Document

Patent Document 1: Japanese Registered Design No. 1175221

SUMMARY OF THE INVENTION

Problem to be Solved by the Invention

However, in the deflector shown in the aforementioned Patent Document 1, since the concave shapes are provided at the upper part throughout the whole of the vehicle, a problem arises in that the weight and the material cost are increased.

The present invention has been made with the foregoing problem taken into consideration and is to provide a sunroof device and a deflector which are low in cost and light in weight.

Solution to the Problem

In order to solve the aforementioned problem, the feature in construction of the invention in one first aspect resides in that a sunroof device comprises a movable panel adapted to be arranged to be able to open and close an opening section provided on a roof of a vehicle; and a deflector which has a body section adapted to be arranged at a front end portion of the opening section, adapted to be arranged to be able to spread out over a surface of the roof in correspondence to the position of the movable panel or to retract under the surface, and extending in the width direction of the vehicle; and support sections associated with both ends of the body section in the width direction and adapted to pivotably support the body section relative to the roof of the vehicle; and that the deflector has a plurality of protruding portions provided at an upper portion of the body section and at a part in the width direction of the body section which part corresponds to the position of a low strength place on the roof of the vehicle.

The feature in construction of the invention in another aspect resides in that a deflector adapted to be arranged at a front end portion of an opening section provided on a roof of a vehicle comprises a body section adapted to be arranged to spread out over a surface of the roof in correspondence to the position of a movable panel, which is adapted to be arranged to be able to open and close the opening section, or to retract under the surface, and extending in the width direction of the vehicle; and support sections associated with both ends of the body section in the width direction and adapted to pivotably support the body section relative to the roof of the vehicle; and that a plurality of protruding portions are provided at an upper portion of the body section and at a part in the width direction of the body section which part corresponds to the position of a low strength place on the roof of the vehicle.

FORM FOR PRACTICING THE INVENTION

Figure 1:
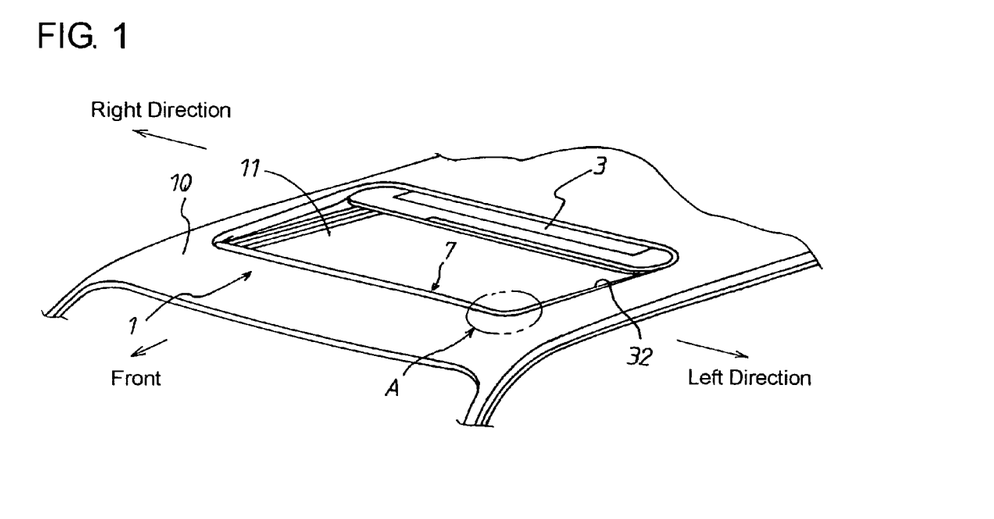
[FIG. 1] is a perspective view of a vehicle roof with a sunroof device according to the present invention.

Hereafter, an embodiment of a sunroof device 1 according to the present invention will be described with reference to FIGS. 1 to 10. FIG. 1 is a perspective view of a roof of a vehicle with the sunroof device 1 according to the present invention. The sunroof device 1 is composed of a movable panel 3 adapted and arranged to be movable in a front-rear direction for opening or closing an opening section 11 provided on the roof 10 being an approximately horizontal flat surface and a deflector 7 adapted and arranged at an front end of the opening section 11. In FIG. 1, the direction indicated by the arrow indicates the front of the vehicle. Further, on the basis of the front shown in FIG. 1, the left and right with a driver being seated to face the front are referred to as left direction and right direction, respectively.

Figure 2:
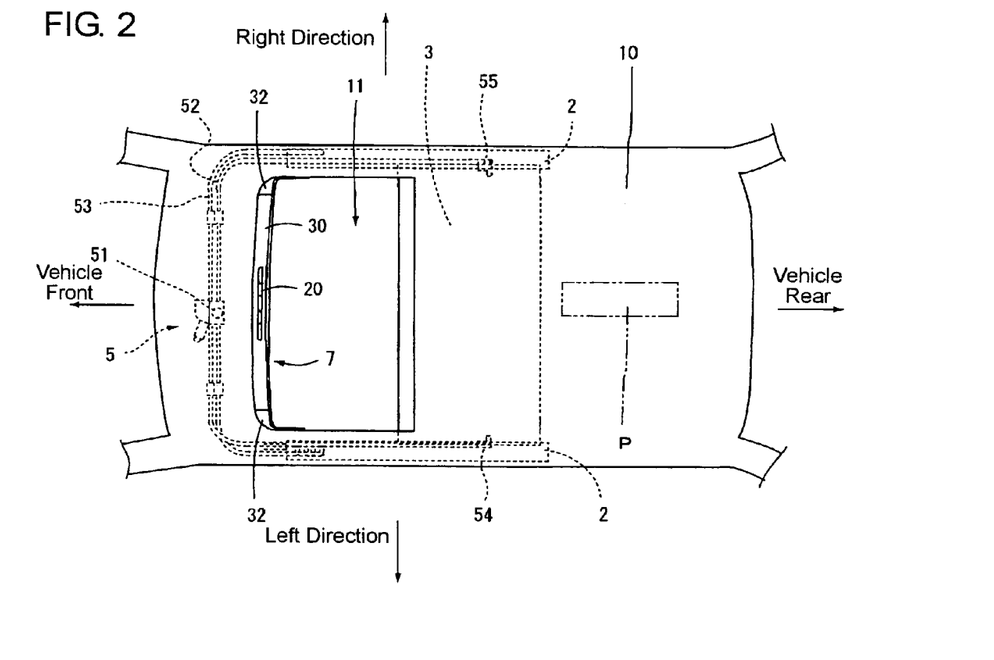
[FIG. 2] is a plan view of the vehicle roof with the sunroof device according to the present invention.

As shown in FIG. 2, the movable panel 3 is supported by guide rails 2 secured to an inner side of the roof 10 at the left and right thereof to be movable in the front-rear direction and is coupled to a drive device 5 through a cable gear 51, cables 52, 53 and connection members 54, 55, so that the movable panel 3 is constructed to operate to advance or retract by the operation of the drive device 5.

The deflector 7 is adapted and arranged to spread out over a surface of the roof 10 when the movable panel 3 is moved rearward to open the opening section 11, and to retract under the surface of the roof 10 when the movable panel 3 is moved forward to close the opening section 11.

Figure 3:
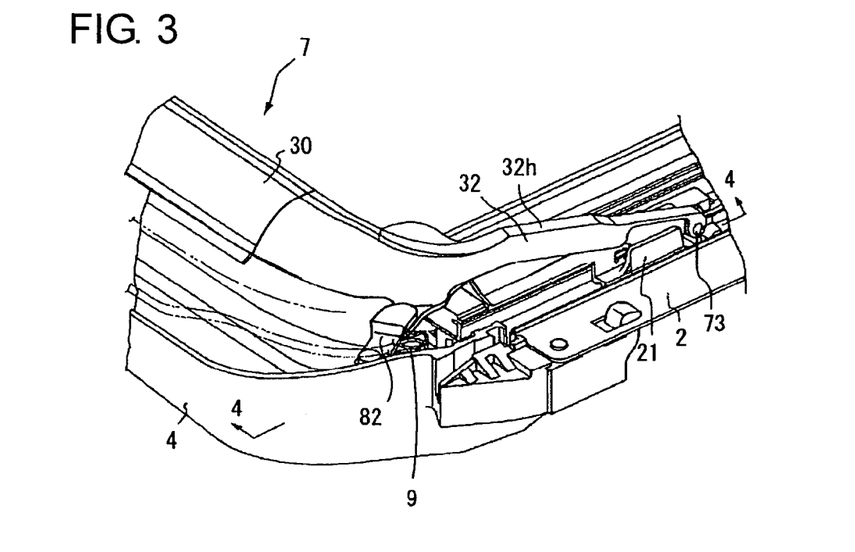
[FIG. 3] is a perspective view of a portion A in FIG. 1.
Figure 4:
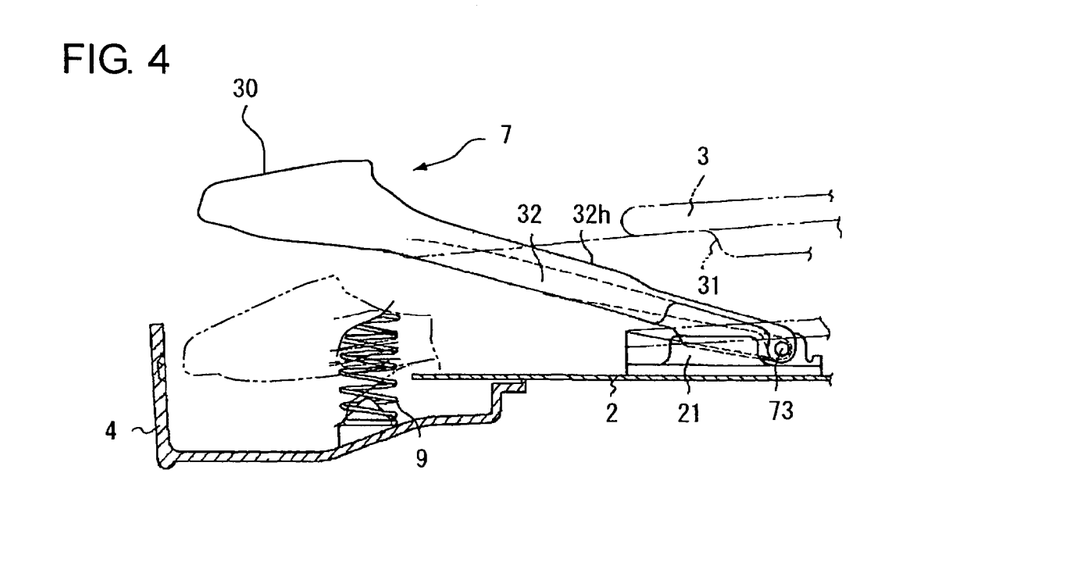
[FIG. 4] is a sectional view of the portion taken along the line 4-4 in FIG. 3.
Figure 5:
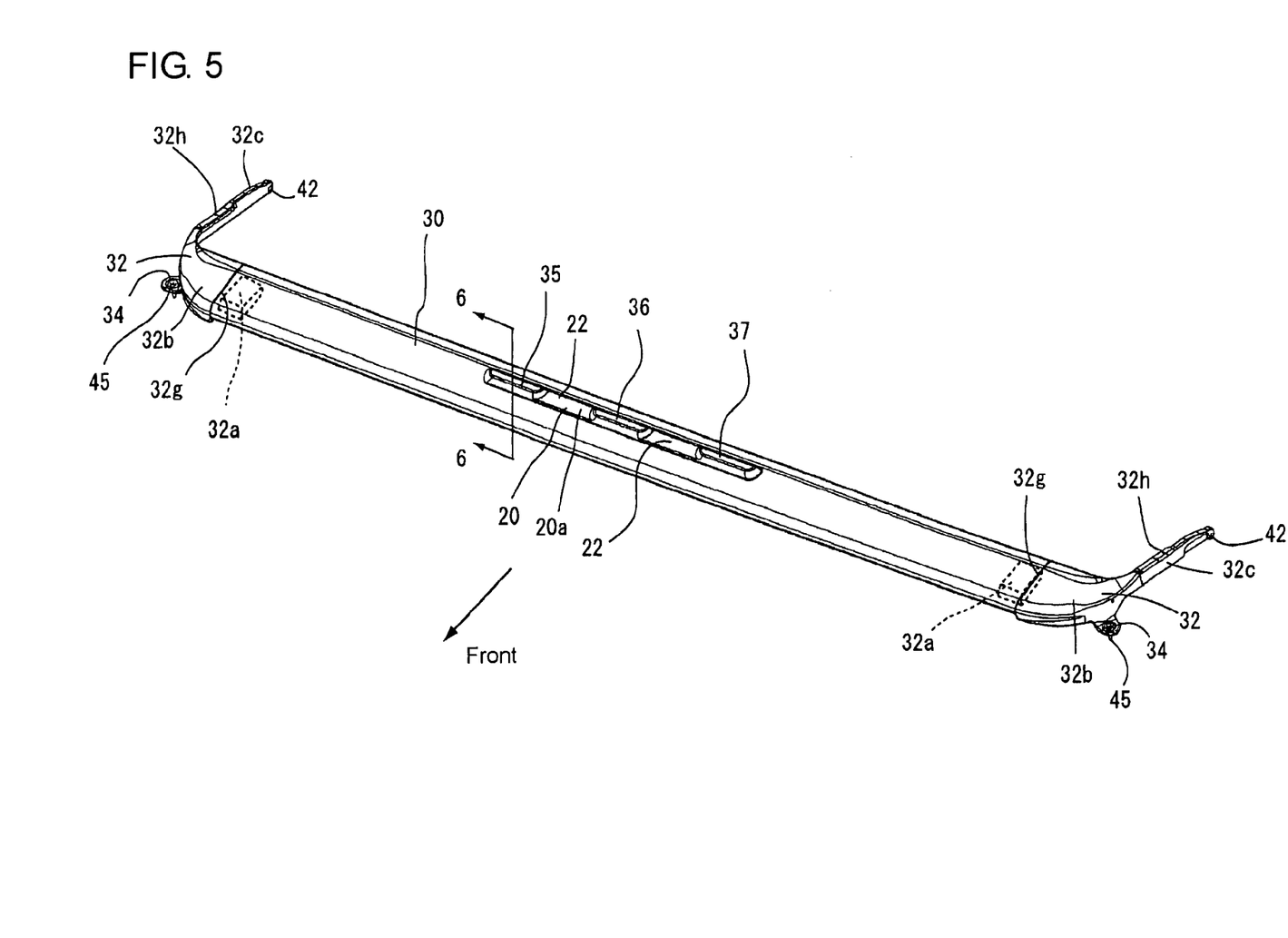
[FIG. 5] is a perspective view of a deflector according to the present invention.

As shown in FIGS. 3 and 5, the deflector 7 is composed of resin-made support sections 32 at both ends thereof adapted to be pivotably supported by the roof 10, a tubular body section 30 made of a light metal such as aluminum or the like, extending in the width direction of the vehicle along the inner side of a front end edge portion of the opening section 11 and associated and secured at its both ends to the support sections 32, and a resin-made vortex generation member 20 having a plurality (three in the present embodiment) of protruding portions 35, 36, 37, which are bodily protruded from an upper surface of a resin-made, plate-like base portion 20a, and secured to an upper surface of the body section 30.

The body section 30 is formed to a tubular shape being hollow in the interior and is formed with an aluminum material by extrusion molding. The body section 30 is a member which, when the vehicle travels with the deflector 7 spreading out over the surface of the roof 10, flows the wind (air flow) flowing on the roof 10 along the upper surface portion of the body section 30 and flows the wind rearward as laminar flow not to make the wind enter the cabin. As shown in the sectional view of FIG. 6 which shows the state that the deflector 7 has spread out over the surface of the roof 10, the body section 30 comprises an upper wall 30a inclined somewhat forward including an upper surface portion which makes a laminar flow, a lower wall 30b further inclined forward than the upper wall 30a, a connection wall 30c extending from a front end of the lower wall 30b at an angle directed upward slightly, a front wall 30d connecting a front end of the connection wall 30c and a front end of the upper wall 30a, and a rear wall 30e connecting a rear end of the upper wall 30a and a rear end of the lower wall 30b. The shape of the body section 30 is made to prevent wind from entering the cabin when the vehicle travels at high speeds with the opening section 11 opened and with the body section 30 spreading out over the surface of the roof 10, and to have a predetermined strength or higher so that strong wind does not cause deformation.

Figure 6:
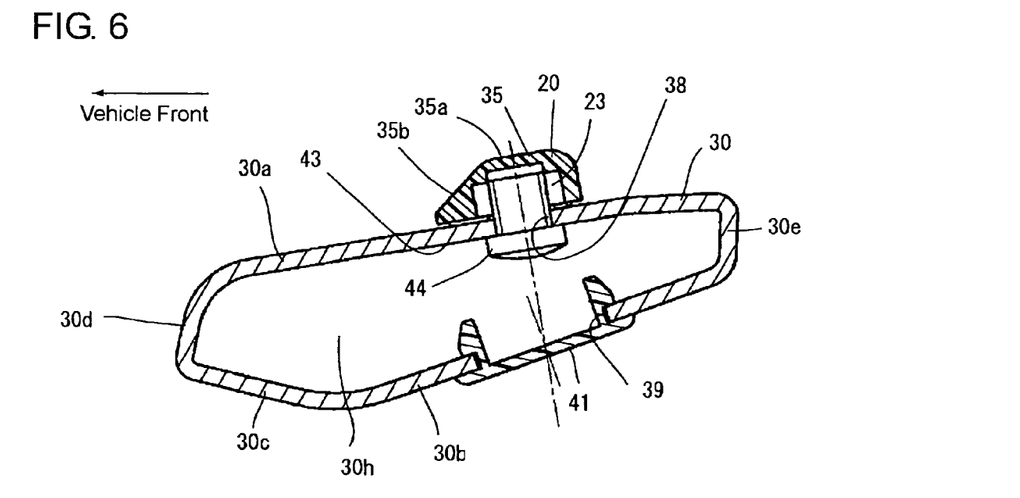
[FIG. 6] is a sectional view of a body section in the deflector according to the present invention.

As shown in FIGS. 5 and 6, on the upper wall 30a of the body section 30, through holes 38 which bolts for securing the vortex generation member 20 from the inner side of the body section 30 pass through are provided at three places which are at regular intervals in parallel to the longitudinal direction of the body section 30. The intervals of the through holes 38 at the three places are about in agreement with the intervals of the protruding portions 35, 36, 37 at three places referred to later which are provided on the vortex generation member 20. Further, on the lower wall 30b, tool insertion holes 39 are respectively provided at three places with the centers on the points where the respective axis center lines of the through holes 38 at the three places provided on the upper wall 30a cross the lower wall 30b.

Figure 7:
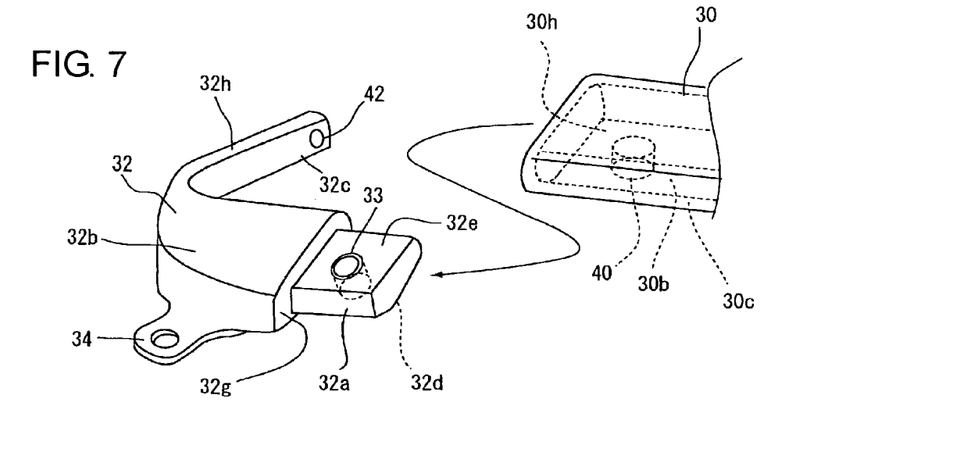
[FIG. 7] is a perspective view of a support section in the deflector according to the present invention.

As shown in FIG. 7, each support section 32 takes an approximately L-shape, and a support protrusion 32a is formed at an end portion of a body portion 32b extending in the vehicle left-right direction. As shown together in FIG. 4, an end portion of a securing portion 32c extending in the vehicle front-rear direction is attached to a bracket 21 secured to the guide rail 2, to be pivotable through a pivot shaft 73. A stopper rib 34 which acts as stopper when the deflector 7 spreads out over the upper surface of the roof 10 protrudes forward from a lower surface of the body portion 32b. The support section 32 is integrally molded with, for example, a resin such as polyamide or the like by using a resin mold.

The support sections 32 are respectively secured at the support protrusions 32a to the both ends of the body section 30. That is, each support protrusion 32a is inserted into an inner hole 30h of the body section 30 to partly overlap the inner surfaces of the lower wall 30b and the connection wall 30c, and a bolt (not shown) passing through a through hole 40 formed on the lower wall 30b is screwed into a nut 33 which is inserted into the support protrusion 32a, to secure each support section 32 to the body section 30. At this time, a stop surface 32g which is between the body portion 32b and the support protrusion 32a is brought into contact with an end surface of the body section 30, so that the attaching position of the support section 32 onto the body section 30 is determined with the attaching strength enhanced.

Each support protrusion 32a is formed to have a predetermined length and is engaged with interior parts of the lower wall 30b and the connection wall 30c in the inner hole 30h of the body section 30. To this end, each support protrusion 32a is provided with an engaging surface 32d which is about in agreement with the inner side shapes of the lower wall 30b and the connection wall 30c in the inner hole 30h.

Each securing portion 32c is a member which takes a square shape in section to extend along an inner side of each side edge portion of the opening section 11, and is provided at its end portion with a bolt through hole 42 for being attached to the bracket 21 of each guide rail 2.

The peripheral shape at the stop surface 32g of the body portion 32b is approximately the same as the peripheral shape of the body section 30, and the body portion 32b is formed to be bent from the end portion which is about in agreement with the peripheral shape of the boy section 30, toward the securing portion 32c and to be connected to the securing portion 32c as it is gradually changed in periphery.

The stop rib 34 takes a tongue shape and, when the deflector 7 spreads out over the surface of the roof 10, brings an upper surface thereof into an approximately horizontal state to restrict the upward movement of the deflect 7 as a result of coming to contact with a contact member 82 which is secured to a frame 4 referred to later as shown together in FIG. 3. The stop rib 34 protrudes from a lower part on the outer side of a bent portion of the body portion 32b which is bent to an approximately L-shape, and has an elastic member 45 made of a resin or rubber and fitted in a hole portion at its center as cushioning material at the time of being brought into contact with the contact member 82.

As shown in FIGS. 2, 5 and 6, the vortex generation member 20 is secured by means of bolts 44 at a predetermined position on the body section 30 so that it comes to be over the body section 30 in the state that the deflector 7 spreads out over the surface of the roof 10. Here, the predetermined position means a position which is set in correspondence to the position of a low strength place P, being low in strength, on the roof 10 of the vehicle. In the present embodiment, the low strength place P is a vehicle center portion in the vehicle width direction of the roof 10 which portion is behind the opening section 11. Accordingly, the three protruding portions 35, 36, 37 of the vortex generation member 20 are secured at a position which is about in agreement with the low strength place P in the vehicle left-right direction. Further, the position at which the vortex generation member 20 is attached to the body section 30 is most favorable to be arranged at an rear end of the body section 30. In the present embodiment, however, it is secured to extend in the left-right direction at a position which is advanced a predetermined amount from the rear end of the body section 30 with the attaching or the like taken into consideration.

Figure 8:
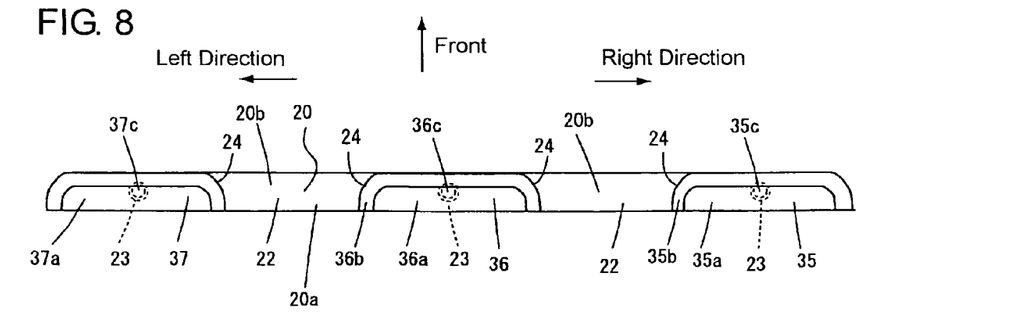
[FIG. 8] is a top view of a vortex generation member in the deflector according to the present invention.
Figure 9:
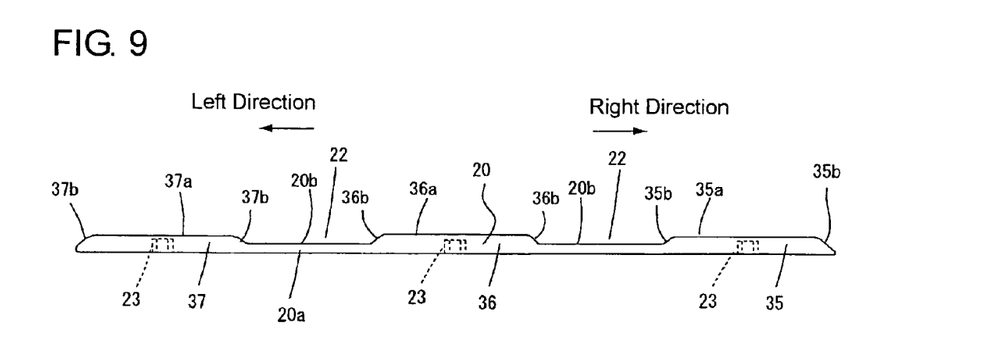
[FIG. 9] is a front view of the vortex generation member in the deflector according to the present invention.

As shown in FIG. 8, the vortex generation member 20 comprises the base portion 20a of a rectangular shape which, when the vortex generation member 20 is secured to the upper wall 30a being an upper surface portion of the body section 30, is put together with the upper surface portion, and the three protruding portions 35, 36, 37 which are protruded from the upper surface of the base portion 20a at regular intervals in the vehicle left-right direction, and is integrally molded with a resin such as, for example, polyamide or the like by using a resin mold. The three protruding portions 35, 36, 37 are the same in shape. The protruding portions 35, 36, 37 comprise flat surface portions 35a, 36a, 37a which are in parallel to the upper surface 20b of the base portion 20a, and inclined portions 35b, 36b, 37b by which the flat surface portions 35a, 36a, 37a and the upper surface 20b of the base portion 20a are connected at a predetermined angle. The shape of each of the flat surface portions 35a, 36a, 37a is a rectangular shape which has long sides in the vehicle left-right direction and which is formed with an arc at each of two corners on the front side, and is arranged on the upper surface 20b of the base portion 20a at a predetermined height. It is favorable that the angle which each of the inclined portions 35b, 36b, 37b makes with the upper surface 20b of the base portions 20a is in the range of 30 to 40 degrees.

The respective distances between the protruding portions 35, 36, 37 formed like this are such that as shown in FIG. 8, there are formed flow passages 22 each of which becomes narrower continuously from the front toward the rear of the vehicle. Accordingly, each flow passage 22 increases the flow velocity of the wind which is generated at the time of the vehicle travelling and which flows thereinto from a front end part of each protruding portion, and effectively generates vortexes when discharging the wind from a rear end part of each protruding portion. Because the effect differs greatly in dependence upon the shape of the protruding portions 35, 36, 37, the most effective shape of the protruding portions 35, 36, 37 is sought out by experiment and is determined.

Further, to be secured by the bolts 44 on the upper surface portion of the upper wall 30a of the body section 30 as shown in FIG. 6, the vortex generation member 20 is provided by insert molding with nuts 23 under the centers 35c, 36c, 37c of the protruding portions 35, 36, 37. The nuts 23 inserted are able to be screw-engaged with the bolts 44 from the lower side of the base portion 20a of the vortex generation member 20, so that the vortex generation member 20 is secured by the bolts 44 at the aforementioned predetermined position on the upper surface portion of the upper wall 30a of the body section 30. After the vortex generation member 20 is secured by the bolts 44, the tool insertion holes 39 which are provided on the lower wall 30b and into which a tool for screw connection of the bolt 44 is inserted are sealed with caps 41. The caps 41 are made of, for example, resin, rubber or the like and are fitted in the tool insertion holes 39.

A gasket 43 made of, for example, acrylic or the like which is an elastic member with a waterproof capability is interposed between the base portion 20a of the vortex generation member 20 and the upper wall 30a of the body section 30 to prevent water from entering the interior of the body section 30. The gasket 43 is a sheet-like member of a predetermined thickness with adhesive element applied to both sides thereof. Further, the gasket 43 has a peripheral shape which is slightly smaller than the peripheral shape of the base portion 20a of the vortex generation member 20 (favorably, smaller by about 1 millimeter than the periphery of the base portion 20a), and, when the vortex generation member 20 is secured by the bolts 44 on the upper surface portion of the upper wall 30a of the body section 30, is compressed in the thickness direction and is expanded in the periphery by being squeezed to become approximately the same shape as the base portion 20a of the vortex generation member 20. Thus, the gasket 43 fills the gap between the base portion 20a and the upper surface portion of the upper wall 30a of the body section 30 to prevent water from entering the body section interior and contributes to an improvement in the good-looking quality.

Further, as shown in FIG. 3, the frame 4 is secured to connect front ends of the guide rails 2 on the both sides, and a spring 9 is attached between the frame 4 and the deflector 7 to urge the deflector 7 to be raised up. Further, the frame 4 has the contact members 82 secured thereto.

Next, description will be made regarding the operation of the sunroof device 1 with the deflector 7 as constructed above. When the movable panel 3 is moved forward from the position indicated by the two-dot-chain line in FIG. 4 to close the opening section 11, a reinforce portion 31 protruding at the lower surface portion of the movable panel 3 is brought into contact at its lower surface with the upper surfaces 32h of the support sections 32 of the deflector 7 to push the deflector 7 down against the spring 9 and moves the deflector 7 to a retracted position indicated by the two-dot chain line in FIG. 4. Conversely, when the movable panel 3 is moved rearward to open the opening section 11, the deflector 7 is raised up to spread out and spreads out over the surface of the roof 10. At this time, the lower surfaces of the contact members 82 secured to the frame 4 are brought into contact with the upper surfaces of the stop ribs 34 provided on the support sections 32 of the deflector 7 through the elastic members 45 fitted in the stop ribs 34, to restrict an upper end position in the spreading-out motion.

Figure 10:
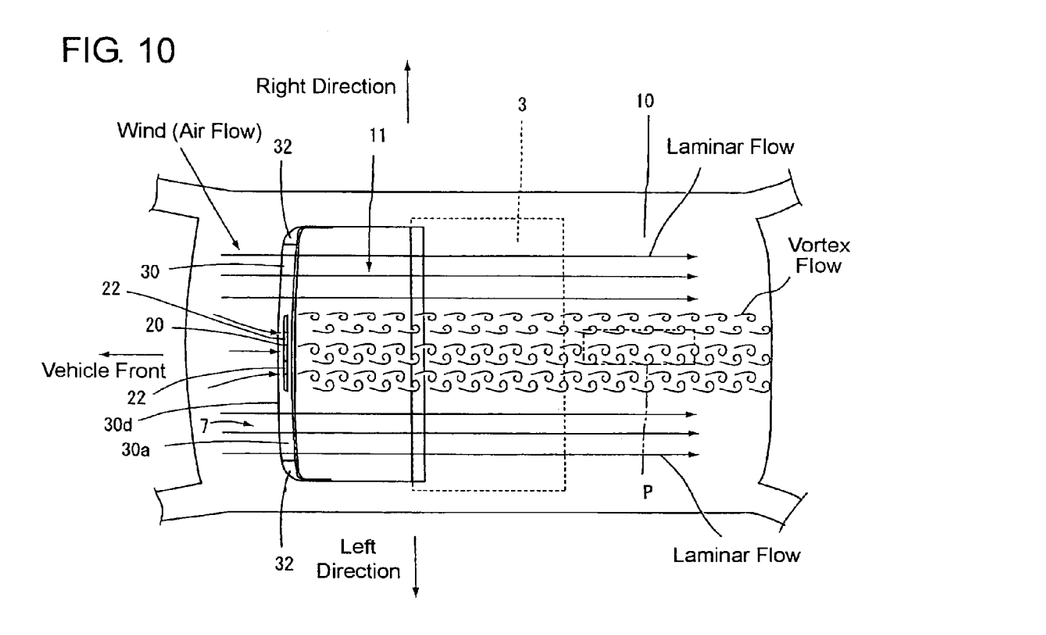
[FIG. 10] is an explanatory view regarding the flow of air by the deflector according to the present invention.

When the vehicle then travels in this state, at the body section 30 of the deflector 7 except for the part where the vortex generation member 20 is secured, as shown in FIG. 10, the wind which flows from the front end part toward the rear of the roof 10 flows from the front wall 30d of the body section 30 along the upper wall 30a to become a laminar flow and flows almost in parallel in the vehicle front-rear direction, so that the wind passes through over the opening section 11 without entering the cabin. Further, a part of the laminar flow flows rearward as it is brought into collision with the roof 10 located behind the opening section 11. The parts of the roof with which the laminar flow is brought into collision at this time are not the low strength place P located at the center part in the left-right direction, but those parts at which a predetermined strength is secured. Therefore, no vibration takes place irrespective of collision with the part of the laminar flow, and hence, the generation of noise does not take place.

Next, description will be made regarding the behavior of the wind at the part where the vortex generation member 20 is secured. At the part where the vortex generation member 20 is secured, the wind flowing rearward from the front end part of the roof 10 flows as laminar flow from the front wall 30d of the body section 30 to the mid course on the upper wall 30a and then, flows into the respective flow passages 22 between the protruding portions 35, 36, 37 of the vortex generation member 20. The flow passages 22 are formed to become narrower continuously from the front toward the rear of the vehicle. The wind flowing into the respective flow passages 22 is increased in the flow velocity as passing through the continuously narrowed flow passages and soon flows out from narrow outlets of the respective flow passages 22 to generate a good vortex flow when flowing out. Then, the good vortex flow generated flows about in parallel in the vehicle front-rear direction and goes through over the opening section 11 without entering the cabin to reach the low strength place P which is behind the opening section 11 and which is at almost the same position as the vortex generation member 20 in the left-right direction of the vehicle. However, the vibration which would otherwise be generated at the low strength place P on the roof 10 is suppressed by the vortex flow, so that noise is hardly generated. Further, the large arc portions 24 are formed at the inlet parts of the flow passages 22 of the vortex generation member 20, that is, on the vehicle front sides of the protruding portions 35, 36, 37 of the vortex generation member 20. Thus, the wind noise which sounds when the wind flows into the flow passages 22 is reduced.

As is clear from the foregoing description, in the present embodiment, on the upper surface portion of the deflector 7, the three protruding portions 35, 36, 37 are provided at such almost the same position in the left-right direction (in the vehicle width direction) as to correspond to the low strength place P which makes a source to generate noise on the roof 10 of the vehicle. Further, the air flow flowing over the roof 10 of the vehicle is turned by the three protruding portions 35, 36, 37 from the laminar flow state to the vortex flow state, and in place of the laminar flow, the vortex flow comes into collision with the low strength place P to reduce the vibration generated at the low strength place P than that which is generated when air of the laminar flow comes into collision with the low strength place P of the roof 10. Since the air flow flowing over the roof 10 is turned by the three protruding portions 35, 36, 37 from the laminar flow state to the vortex flow state in this manner, the vibration of the low strength place P on the vehicle roof 10 is reduced, so that noise can be effectively prevented. Further, the three protruding portions 35, 36, 37 are provided on the part in the vehicle width direction of the body section 30 of the deflector 7 which part corresponds to the position of the low strength place P of the roof 10 of the vehicle. Thus, because no protruding portions are provided at the positions of the body section 30 of the deflector 7 which positions correspond to high strength parts of the roof 10 which parts do not generate noise irrespective of collision with the laminar flow, the weight and material of the protruding portions can be reduced, so that it can be realized to make the deflector 7 low in cost and light in weight.

Further, in the present embodiment, the respective distances between the three protruding portions 35, 36, 37 are made to be narrower continuously from the front toward the rear of the vehicle. Thus, the wind of the laminar flow which flows over the vehicle roof during the vehicle travelling flows into the wide gaps between the protruding portions 35, 36, 37, is increased in the velocity as it goes through the continuously narrowed passages and effectively flows out in the form of a vortex flow from the narrow outlets between the protruding portions 35, 36, 37. Since it is possible to turn the air flow flowing over the vehicle roof 10 to the stronger vortex flow, the noise caused by the vibration can be prevented further effectively.

Further, in the present embodiment, the deflector 7 has the tubular body section 30 made of aluminum being a light metal, and the support sections 32 supporting the both sides of the body section 30 and the vortex generation member 20 are made of a resin, so that the reduction in dimension and weight can be realized.

Furthermore, in the present embodiment, since the base portion 20a of the resin-made vortex generation member 20 protruding the three protruding portions 35, 36, 37 is secured to the body section 30 through the gasket 43 which is an elastic member having almost the same peripheral shape as the peripheral shape of the base portion 20a and which has a waterproof capability, it is possible to prevent water from entering the interior of the tubular body section 30. Therefore, the enhancement in reliability can be realized, and the good-looking quality can be improved.

Although the present embodiment has been described as the sunroof device 1 having the panel 3 and the deflector 7, another embodiment, without being limited to this, may take the construction of a deflector only which has the same construction as the deflector 7 described in the foregoing embodiment. Thus, the same effects as the foregoing embodiment can be obtained, and the installation becomes possible in various vehicles with a sunroof, so that the versatility can be enhanced.

Further, although in the present embodiment, the generation of noise is prevented by securing the vortex generation member 20 with the three (odd number) protruding portions 35, 36, 37 on the upper surface portion of the body section 30 about in agreement with the low strength place P of the roof 10 in the left-right direction of the vehicle and by generating the vortex flow, the vortex generation member 20, without being limited to this, may have four (even number) protruding portions protruded at the same portion. That is, although in the present embodiment, the center portion of the vortex generation member 20 which portion corresponds to the center portion of the low strength place is made to be convex, the center portion may be concave. It has been confirmed by the inventors that the same effects as the foregoing can also be accomplished by doing so.

Further, although in the present embodiment, the large-arc portions 24 are provided at the inlet part of each flow passage 22 of the vortex generation member 20, that is, on the vehicle front side of each protruding portion of the vortex generation member 20, the same effect as the foregoing can be accomplished without forming the arc portions 24 at the inlet part of each flow passage 22.

Further, although in the present embodiment, the body section 30 of the deflector 7 is made of aluminum, there may be used magnesium, titanium or the like being a right metal without limited to this. By doing so, the securing of strength and the reduction in weight can both be realized together like the foregoing.

Further, in the present embodiment, the rear-center part of the roof 10 is the low strength place P. However, where the low strength place P is, for example, the rear left side or the rear right side, the same effects can be accomplished by providing the vortex generation member 70 at the corresponding place on the deflector 7.

Further, although in the present embodiment, the vortex generation member 20 is made of a resin, it may be made of aluminum or the like. Furthermore, although in the present embodiment, the body section 30 and the vortex generation member 20 of the deflector 7 are separate members, they may be bodily formed with aluminum or the like.

Furthermore, although in the present embodiment, the protruding portions 35, 36, 37 of the vortex generation member 20 is a one-piece member, they may be separate members, and by doing so, the same effects can be accomplished.

Various features and many of the attendant advantages in the foregoing embodiment will be summarized as follows:

In the sunroof device 1 according to the foregoing embodiment typically shown in FIGS. 5, 8 and 10, the deflector 7 has the plurality of protruding portions 35, 36, 37 at the upper portion of the body section 30. Further, the air flow flowing on the roof 10 of the vehicle is turned by the plurality of protruding portions 35, 36, 37 from a laminar flow state to a vortex flow state, and in place of the laminar flow, the vortex flow comes into collision with the low strength portion of the roof to reduce a vibration generated at the low strength portion P than that generated when air in the laminar flow comes into collision with the low strength portion P. Because the air flow flowing on the roof 10 is turned by the protruding portions 35, 36, 37 from the laminar flow state to vortex flow state in this way, the vibration of the low strength portion P on the vehicle roof 10 is diminished, so that noise can be prevented effectively. Further, the plurality of protruding portions 35, 36, 37 are provided at the part in the width direction of the body section 30 of the deflector 7 which part corresponds to the position of the low strength portion P of the roof 10 of the vehicle. Therefore, no protruding portions are provided at the positions of the body section 30 of the deflector 7 which positions correspond to high strength portions of the roof 10 which do not generate noise irrespective of collision with the laminar flow, the weight of the protruding portions 35, 36, 37 and the material therefor can be reduced, so that it can be realized to reduce the cost and weight of the deflector 7.

In the sunroof device 1 according to the foregoing embodiment typically shown in FIGS. 2, 5 and 10, the low strength position. P on the vehicle roof 10 is set to the center place in the vehicle width direction of the vehicle roof 10 which place is behind the opening section 11 and which place is hard to reinforce due to the construction of the vehicle roof 10. Therefore, by bringing a part of the vortex flow which is generated by the plurality of protruding portions 35, 36, 37 provided in correspondence to the position of the center place, into collision with the center place of the vehicle roof 10 which is liable to become low in strength, it is possible to effectively prevent the vibration or noise which is caused by the collision of the laminar flow.

In the sunroof device 1 according to the foregoing embodiment typically shown in FIGS. 2, 5 and 10, the plurality of protruding portions 35, 36, 37 are provided at the upper surface portion of the body section 30 of the deflector 7 which is for flowing the laminar flow. Therefore, a part of the laminar flow which flows on the upper surface portion of the body section 10 of the deflector 7 is reliably converted by the plurality of protruding portions 35, 36, 37 into a vortex flow in the mid course thereof. Further, because in place of the laminar flow, the part of the vortex flow comes into collision with the low strength portion P on the vehicle roof 10, it is possible to effectively prevent the vibration or noise at the low strength portion P. Further, since the plurality of protruding portions 35, 36, 37 are provided at a part of the upper surface portion of the body section 30, it is unnecessary to form the body section 30 and the plurality of protruding portions 35, 36, 37 of the deflector 7 bodily with a resin, or it is possible to miniaturize the body section 30 even in the case of being formed bodily, so that reduction in weight and cost can be realized.

In the sunroof device 1 according to the foregoing embodiment typically shown in FIGS. 5, 8 and 10, since the respective distances between the plurality of protruding portions 35, 36, 37 are made to become narrower continuously from the front toward the rear of the vehicle, the wind in the laminar flow state which flows on the vehicle roof 10 during the travelling of the vehicle flows into wide gaps between the protruding portions 35, 36, 37, is increased in flow velocity as it goes through passages 22 each becoming narrower continuously, and flows out from narrow outlets between the protruding portions 35, 36, 37 by being effectively turned into a vortex flow. Since it is possible for the protruding portions 35, 36, 37 to turn the air flow flowing on the vehicle roof 10 into a stronger vortex flow, it is possible to prevent the vibration-caused noise further effectively.

In the sunroof device 1 according to the foregoing embodiment typically shown in FIGS. 5-7, because the tubular body section 30 is made of a light metal and the support sections 32 supporting the both sides of the body section 30 and the plurality of protruding portions 35, 36, 37 are made of a resin, the deflector 7 can be reduced in dimension and weight.

In the sunroof device 1 according to the foregoing embodiment typically shown in FIGS. 5, 6 and 8, since the resin-made base portion 20a of the deflector 7 with the plurality of protruding portions 35, 36, 37 being protruded is secured to the body section 30 through the elastic member 43 which is approximately the same in peripheral shape as the base portion 20a and which has a waterproof capability, it is possible to prevent water from entering the interior of the tubular body section 30. This can enhance reliability and contribute to an improvement in the good-looking quality.

In the deflector 7 according to the foregoing embodiment typically shown in FIGS. 5, 8 and 10, the air flow flowing on the roof 10 of the vehicle is turned by the plurality of protruding portions 35, 36, 37 provided on the deflector 7 from the laminar flow state to the vortex flow state, and in place of the laminar flow, the vortex flow comes into collision with the low strength portion P to reduce the vibration generated at the low strength portion P than that generated when the air in the laminar flow comes into collision with the low strength portion P of the roof 10. Because the air flow flowing on the roof 10 is turned by the protruding portions 35, 36, 37 from the laminar flow state to the vortex flow state in this way, the vibration of the low strength portion P on the vehicle roof 10 is diminished, so that noise can be prevented effectively. Further, the plurality of protruding portions 35, 36, 37 are provided at the part in the vehicle width direction of the body section 30 of the deflector 7 which part corresponds in position to the low strength portion P of the roof 10 of the vehicle. Therefore, because no protruding portions are provided at the positions of the body section 30 of the deflector 7 which positions correspond to high strength portions of the roof 10 which do not generate noise irrespective of collision with the laminar flow, the weight of the protruding portions 35, 36, 37 and the material therefor can be reduced, so that it can be realized to reduce the cost and weight of the deflector 7. Further, the application is possible to various vehicles with a sunroof, and improvement is made in versatility.

In the deflector 7 according to the foregoing embodiment typically shown in FIGS. 2, 5 and 10, the low strength position P on the vehicle roof 10 is set to the center place in the vehicle width direction which place is behind the opening section 11 of the vehicle roof 10 and which place is hard to reinforce due to the construction of the vehicle roof 10. Therefore, by bringing a part of the vortex flow which is generated by the plurality of protruding portions 35, 36, 37 provided in correspondence to the position of the center place, into collision with the center portion of the vehicle roof 10 which is liable to become low in strength, it is possible to effectively prevent the vibration or noise which is caused by the collision of the laminar flow.

In the deflector 7 according to the foregoing embodiment typically shown in FIGS. 2, 5 and 10, the plurality of protruding portions 35, 36, 37 are provided at the upper surface portion of the body section 30 of the deflector 7 which is for flowing the laminar flow. Therefore, a part of the laminar flow which flows on the upper surface portion of the body section 30 of the deflector 7 is reliably converted by the plurality of protruding portions 35, 36, 37 into a vortex flow in the mid course thereof. Further, because in place of the laminar flow, a part of the vortex flow comes into collision with the low strength portion P on the vehicle roof 10, it is possible to effectively prevent the vibration or noise at the low strength portion P. Further, since the plurality of protruding portions 35, 36, 37 are provided at a part of the upper surface portion of the body section 30, it is unnecessary to form the body section 30 and the plurality of protruding portions 35, 36, 37 of the deflector 7 bodily with a resin, or it is possible to miniaturize the body section 30 even in the case of being formed bodily, so that reduction in weight and cost can be realized.

In the deflector 7 according to the foregoing embodiment typically shown in FIGS. 5, 8 and 10, the respective distances between the plurality of protruding portions 35, 36, 37 are made to become narrower continuously from the front toward the rear of the vehicle. Therefore, the wind in the laminar flow state which flows on the vehicle roof 10 during the travelling of the vehicle flows into wide gaps between the protruding portions 35, 36, 37, is increased in flow velocity as it goes through passages 22 each becoming narrower continuously, and flows out from narrow outlets between the protruding portions 35, 36, 37 by being effectively turned into the vortex flow. Since it is possible for the protruding portions 35, 36, 37 to turn the air flow flowing on the vehicle roof 10 into a stronger vortex flow, it is possible to prevent the vibration-caused noise further effectively.

In the deflector 7 according to the foregoing embodiment typically shown in FIGS. 5-7, because the tubular body section 30 is made of a light metal and the support sections 32 supporting the both sides of the body section 30 and the plurality of protruding portions 35, 36, 37 are made of a resin, it can be realized to reduce in dimension and weight.

In the deflector 7 according to the foregoing embodiment typically shown in FIGS. 5, 6 and 8, since the resin-made base portion 20a with the plurality of protruding portions 35, 36, 37 being protruded is secured to the body section 30 through the elastic member 43 which is approximately the same in peripheral shape as the base portion 20a and which has a waterproof capability, it is possible to prevent water from entering the interior of the tubular body section 30. This can enhance reliability and contribute to an improvement in the good-looking quality.

INDUSTRIAL APPLICABILITY

A sunroof device and a deflector according to the present invention is capable of effectively suppressing the flow of wind into a cabin when a travelling is done with a roof opened and also of reducing the noise which is generated by the collision of wind with the vehicle roof, and is therefore suitable to a vehicle with an opening section on the roof.

The invention claimed is:

1. A sunroof device comprising:
a movable panel configured to open and close an opening section provided on a roof of a vehicle; and
a deflector comprising:
a body section positioned at a front end portion of the opening section, configured to be able to spread out over a surface of the roof in correspondence to the position of the movable panel or to retract under the surface, and extending in the width direction of the vehicle; and
support sections associated with both ends of the body section in the width direction and pivotably supporting the body section relative to the roof of the vehicle;
wherein the deflector has a vortex generation member formed by a different member from the deflector and provided at an upper portion of the body section to move integrally with the deflector; and
wherein the vortex generation member has a plate-like base portion and a plurality of protruding portions which are bodily protruded from an upper surface of the base portion.

2. The sunroof device as set forth in claim 1, wherein the vortex generation member is fixed on the upper portion of the body section.

3. The sunroof device as set forth in claim 1, wherein:
the body section has an upper surface portion which makes a laminar flow of wind which flows from a front end part rearward on the roof of the vehicle during a travelling of the vehicle; and
the vortex generation member is fixed on the upper surface portion of the body section.

4. The sunroof device as set forth in claim 1, wherein respective distances between the plurality of protruding portions are made to become narrower continuously from the front toward the rear of the vehicle.

5. The sunroof device as set forth in claim 1, wherein the deflector is composed of:
the support sections made of a resin;
the body section made of a light metal, taking a tubular shape and secured to the support sections; and
the vortex generation member made of a resin and secured to the body section.

6. The sunroof device as set forth in claim 5, wherein:
an elastic member with a waterproof capability is interposed between the body section and the base portion.

7. A deflector adapted to be arranged at a front end portion of an opening section provided on a roof of a vehicle and comprising:
a body section adapted to be arranged to be able to spread out over a surface of the roof in correspondence to the position of a movable panel, which is adapted to be arranged to be able to open and close the opening section, or to retract under the surface, and extending in the width direction of the vehicle;
support sections associated with both ends of the body section in the width direction and adapted to pivotably support the body section relative to the roof of the vehicle;
a vortex generation member formed by a different member from the deflector and provided at an upper portion of the body section to move integrally with the deflector; and
wherein the vortex generation member has a plate-like base portion and a plurality of protruding portions which are bodily protruded from an upper surface of the base portion.

8. The deflector as set forth in claim 7, wherein the vortex generation member is fixed on the upper portion of the body section.

9. The deflector as set forth in claim 7, wherein:
the body section has an upper surface portion which makes a laminar flow of wind flowing from a front end part toward a rear of the roof of the vehicle during a travelling of the vehicle; and
the vortex generation member is fixed on the upper surface portion of the body section.

10. The deflector as set forth in claim 7, wherein respective distances between the plurality of protruding portions are made to become narrower continuously from the front toward the rear of the vehicle.

11. The deflector as set forth in claim 7, wherein: the support sections are made of a resin;
the body section is made of a light metal, takes a tubular shape and is secured to the support sections; and
the vortex generation member is made of a resin and is secured to the body section.

12. The deflector as set forth in claim 11, wherein:
an elastic member with a waterproof capability is interposed between the body section and the base portion.

13. The sunroof device as set forth in claim 3, wherein the vortex generation member is secured on the upper surface portion of the body section at a plurality of places.

14. The sunroof device as set forth in claim 1, wherein the vortex generation member is provided at a center portion in the width direction of the vehicle.

15. The sunroof device as set forth in claim 1, wherein the plurality of protruding portions of the vortex generation member are arranged in the width direction of the vehicle.

16. The sunroof device as set forth in claim 15, wherein of the plurality of protruding portions on the vortex generation member, one is provided at a center in the width direction of the vehicle.

17. The deflector as set forth in claim 9, wherein the vortex generation member is secured on the upper surface portion of the body section at a plurality of places.

18. The deflector as set forth in claim 7, wherein the vortex generation member is provided at a center portion in the width direction of the vehicle.

19. The deflector as set forth in claim 7, wherein the plurality of protruding portions of the vortex generation member are arranged in the width direction of the vehicle.

20. The deflector as set forth in claim 19, wherein of the plurality of protruding portions on the vortex generation member, one is provided at a center in the width direction of the vehicle.

* * * * *